Figure 1:
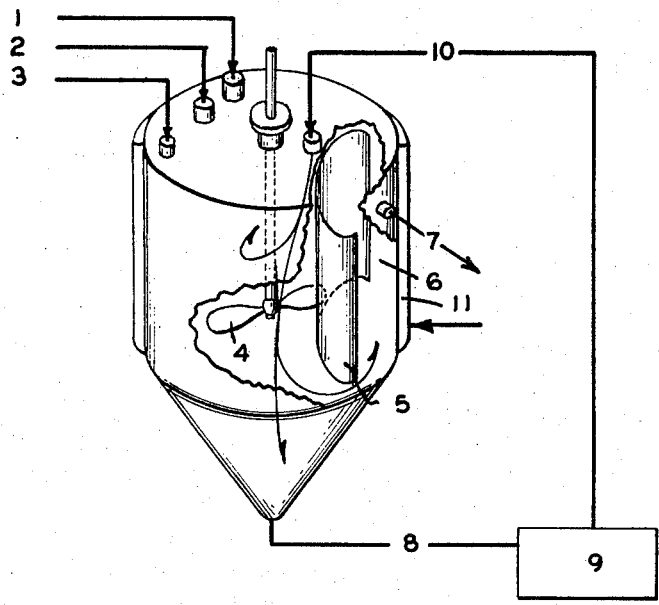

United States Patent
Watson et al.

[15] 3,677,477
[45] July 18, 1972

[54] APPARATUS FOR PREPARING DISPERSIONS OF FINELY-DIVIDED ALKALI METAL

[72] Inventors: Lloyd M. Watson; William R. Birchall, both of Cincinnati, Ohio

[73] Assignee: National Distillers and Chemical Corporation, New York, N.Y.

[22] Filed: June 1, 1970

[21] Appl. No.: 54,075

Related U.S. Application Data

[62] Division of Ser. No. 667,023, Aug. 18, 1967, Pat. No. 3,580,860.

[52] U.S. Cl..............................241/31, 241/46.17, 241/80, 241/97
[51] Int. Cl.........................................................B02c 11/06
[58] Field of Search............241/31, 46, 46.02, 46.13, 46.17, 241/68, 79.1, 80, 97

[56] References Cited

UNITED STATES PATENTS

| | | | |
|---|---|---|---|
| 2,520,320 | 8/1950 | Lyons et al. | 241/80 X |
| 1,977,807 | 10/1934 | Robinson | 241/97 X |
| 2,277,477 | 3/1942 | Crawford | 241/97 X |
| 2,685,826 | 8/1954 | Black | 241/97 X |
| 2,903,191 | 9/1959 | Rietz | 241/97 X |

*Primary Examiner*—Granville Y. Custer, Jr.
*Attorney*—Allen A. Meyer, Jr.

[57] ABSTRACT

Apparatus for preparing dispersions of finely divided alkali metal substantially uniform in alkali metal concentration and having a narrow particle size below a predetermined median, said apparatus comprising a mixing tank divided by a vertically disposed baffle into a mixing zone and a substantially smaller quiescent, settling zone. Molten sodium feed and a dispersing aid mixture is agitated within said mixing zone in an inert gas blanket and alkali metal particles gravitate through the settling zone to the bottom of the mixing tank at which point the mixture containing said particles is drawn off in a continuous operation and passed to an homogenizer providing a high shear dispersion zone wherein the metallic particles are reduced in size and the mixture is returned to the mixing tank. Through repeated recirculation, such metallic particles as become reduced in size to the predetermined median size desired rise to the top of the quiescent, settling zone at which point the desired uniform dispersion containing only fine metallic particles within a closely controlled range is withdrawn.

5 Claims, 4 Drawing Figures

Patented July 18, 1972

3,677,477

INVENTORS
LLOYD M. WATSON &
WILLIAM R. BIRCHALL

BY *Allen A. Meyer, Jr.*

ATTORNEY

APPARATUS FOR PREPARING DISPERSIONS OF FINELY-DIVIDED ALKALI METAL

This is a divisional application taken from application Ser. No. 667,023, filed Aug. 18, 1967, and now U.S. Pat. No. 3,580,862.

The present invention relates to a continuous process and apparatus for preparing dispersions in a hydrocarbon medium of finely divided alkali metal in the presence of a dispersing aid for the alkali metal, and more particularly to a continuous process for preparing sodium dispersions wherein the sodium is present in a substantially uniform average particle size and concentration, and to a process for preparing alfin catalysts employing such sodium dispersions.

Alkali metal dispersions and especially sodium dispersions have been found to be highly useful for many applications. For example, sodium dispersions may be used to advantage in reactions, such as those involving chlorohydrocarbons in which a coupling or reduction of the chlorohydrocarbon is desirable, in dimerization and polymerization reactions with unsaturated olefin such as butadiene, and in dimerizing and polymerizing reactive monomers, such as styrene or α-methyl styrene. Sodium dispersions may also be used as an efficient purifying agent for various inert solvents and gas streams and as a reactive base for providing finely divided sodium salts in a hydrocarbon medium.

Furthermore, sodium dispersions prepared in accordance with the instant invention are particularly useful in the preparation of alfin catalysts.

Morton and coworkers in a series of papers in the *Journal of the American Chemical Society*, starting in 1947, describe an organoalkali metal catalyst for the polymerization of olefins and particularly dienes which they term an alfin catalyst, *Journal of the American Chemical Society* 69 161; 167; 950; 1,675; 2,224 (1947). The name alfin is taken from the use of an alcohol and an olefin in their preparation. The alcohol, a methyl n-alkyl carbinol, usually isopropanol, in the form of the sodium salt, and the olefin, also in the form of the sodium salt, and alkali metal halide, form a complex that constitutes the catalyst.

These catalysts are reported by Morton et al. to cause the polymerization of butadiene, isoprene and other dienes, alone and together with other copolymerizable organic compounds, in most cases olefinic in nature. The catalyst was discovered in the course of a study of the addition of organosodium compounds to dienes. Later on, Morton summarized the work done up until 1950 in *Industrial and Engineering Chemistry*, 42 1,488–1,496 (1950).

The polymers obtained using alfin catalysts are termed alfin polymers or alfin rubbers, and contain sodium in the molecule. Because of the speed and ease of the reaction, these attracted considerable interest in the 1940's and early 1950's. However, the very speed of the reaction led to problems. The alfin rubbers have the disadvantage of having an extremely high molecular weight, generally in excess of 3,000,000, and frequently in excess of 10,000,000. As a result, although these polymers are generally gel-free and have high tensile strength, superior abrasion resistance, and tear strength, they are also very tough, and exhibit little breakdown and consequently poor banding on the mill. Therefore, they are difficult if not impossible to process using conventional equipment. Consequently, interest and research in the alfin rubbers until recently was minimal, and in their original form the alfin rubbers have found very little commercial application.

Pfau et al. U.S. Pat. Nos. 2,964,083, granted Dec. 13, 1960, and 3,074,902, granted Jan. 22, 1963, endeavored to reduce the working viscosity of the alfin polymers by the incorporation of liquid plasticizers, particularly petroleum hydrocarbon oil. The resulting products were indicated to be particularly useful in the manufacture of tire treads.

For the first time, alfin rubbers of relatively low and medium molecular weight ranging from about 50,000 to about 1,250,000 were provided by Greenberg et al. U.S. Pat. Nos. 3,067,187, granted Dec. 4, 1962, and 3,223,691, granted Dec. 14, 1965. This restriction on molecular weight was made possible by incorporation of a molecular weight moderator, a dihydro aromatic compound, with the alfin catalyst during the polymerization. As a result, commercial interest in the alfin polymers has been renewed, and with it interest in large-scale preparation of alfin catalysts.

Morton describes the preparation of the catalyst used in the alfin rubber process. Amylsodium is prepared from amylchloride by reaction with sodium metal. Alcohol is added to destroy half or more of the amylsodium, thereby furnishing the alkoxide in a finely divided state. Propylene is then passed into the mixture. All operations are carried out in a high speed stirring apparatus, under an atmosphere of dry nitrogen. Half of the product is sodium chloride, which remains with the catalyst. From some preparations, gentle centrifuging or decanting will throw out first the traces of sodium metal left by failure of the first step, formation of amylsodium, to proceed 100 percent, and secondly, the small amount of blue sodium chloride that often accompanies the reaction. The remainder is the mixture of catalyst and sodium chloride. In general, the alkoxide must be derived from a secondary alcohol, one branch of which is a methyl group, and the olefin must have the essential system $CH_2 = CHCH_2-$.

Greenberg et al. U.S. Pat. Nos. 3,067,187 and 3,223,691 describe the preparation of alfin catalysts using dry hexane as the solvent. Finely divided sodium dispersed in alkylate was added to the hexane. The slurry was cooled to $-10°$ C., and the dry n-amyl chloride then added, with moderate stirring, which was continued for 1 hour after the addition had been completed. Then, isopropyl alcohol was added, with additional stirring, and finally, dry propylene was introduced into the mixture, maintaining the temperature all the while at $-10°$ C. until active reflux of the propylene occurred. The temperature was then raised gradually to $25°$ C., the propylene allowed to leave the system, and the reaction slurry transferred to a storage vessel under argon, where it was diluted with dry hexane, and was then ready for use in the preparation of alfin rubbers.

The preparation of the sodium slurry in an inert diluent employed in the reaction represents an important aspect of the catalyst preparation. Greenberg et al. point out that a particularly effective alfin catalyst is obtained when the sodium is employed as a finely divided dispersion in the inert diluent, and suggest a dispersion in which the maximum sodium average particle size is about 1 to 2 microns, such as may be prepared on a Gaulin mill. Greenberg et al. comment that when such finely divided sodium is used, ordinary stirring devices may be employed, instead of high speed comminuting equipment, in the preparation of the catalyst. A good yield of amylsodium and good yields of sodium isopropoxide and allylsodium are obtainable, and the alfin catalyst and end products of the polymerization are then relatively free of metallic sodium contamination. Moreover, catalyst activity can be more readily reproduced.

A number of disclosures pertaining to the preparation of alkali metal dispersions are available in the prior art. For example, Hill U.S. Pat. No. 2,758,096 dated Aug. 7, 1956, in discussing the prior art discloses a procedure for preparing alkali metal dispersions by fusing the alkali metal in an inert liquid and subjecting the entire mixture to vigorous agitation while maintaining a temperature at which the alkali metal is in the molten state. Hill indicates that such a procedure results in a suspension of finely divided particles of alkali metal having a particle size of the order of 5 to 10 microns or even less. Hill indicates that such dispersions are improved by adding a small amount of a dispersing agent to enhance the formation of particles of uniform size and also to prevent the metal from settling on storage for prolonged periods. The Hill invention is actually directed to the use of activated clay as a dispersing agent. The activated clay is added during the agitation of the molten alkali metal and inert liquid or prior thereto, in an amount of from 0.05 to 5 percent by weight of the total mixture. Hill indicates that the resulting dispersion contains finely divided particles of alkali metal having an average size of from 5 to 10 microns.

Robinson et al. U.S. Pat. No. 3,012,974, dated Dec. 12, 1961, disclose a method for preparing finely divided sodium dispersions in substantially reproducible manner with respect to particle size and superior activity characteristics, which comprises preparing the fine dispersions of sodium in a suitable inert liquid in the presence of an emulsifying agent and a small amount of water, for example, from 0.1 to 1.5 percent based on the weight of sodium. Examples of emulsifying agents taught by Robinson et al. include aluminum stearate, aluminum laurate, and copper oleate. Robinson et al. teach that their dispersions can be prepared by use of a colloid mill blanketed with an inert gas, such as argon.

Fatt and Tashima in *Alkali Metal Dispersions*, D. Van Nostrand Company, Inc. 1961, set out on page 53 a typical arrangement of equipment for the continuous preparation of sodium dispersions. This equipment comprises a mixing tank equipped with a high shear mixer, separate feed inlets for sodium, and a mixture of hydrocarbon solvent and dispersing aid, and an inlet and outlet for nitrogen, and an overflow outlet through which sodium dispersion is collected. The overflow outlet is shrouded with a baffle to prevent splashing or irregular flow. This apparatus delivers a mixture of fine and coarse particles of alkali metal, some of which may be too coarse for certain purposes, because there is no control over the size of particles entering the outlet.

In accordance with the instant invention, a continuous process for preparing a uniform dispersion of a finely divided alkali metal in an inert organic diluent is provided having substantially no particles above a predetermined maximum, and having a substantially uniform alkali metal concentration. The process comprises continuously dispersing a molten alkali metal in an inert organic diluent with a dispersing aid which is soluble in the inert diluent and if necessary, a stabilizing agent, by subjecting the molten alkali metal to high shear forces, and form alkali metal particles less than and greater than a predetermined median, allowing coarse particles of molten alkali metal at or above the median size to settle out, and drawing off supernatant fine particles of molten alkali metal at or below the median size after settling of the larger particles, continuously returning the coarse particles to the zone of high shear to further reduce their size, again allowing coarse particles to settle out, and so repeating the process so that eventually all of the alkali metal has been reduced to a size at or below the median size, while continuously adding additional alkali metal and continuously withdrawing a dispersion of fine particles of alkali metal having a size at or below the median and a substantially uniform alkali metal concentration.

The process of the invention permits the continuous production of alkali metal dispersions in inert organic diluents in which the average particle size of the alkali metal is substantially uniform and is within quite narrow limits. A range of from about 1 to about 10 microns, with about 80 percent of the particles being below 5 microns, is easily maintained. The process even permits the preparation of alkali metal dispersions having substantially no particles in excess of about 10 microns, and an average particle size of about 1 to 3 microns. This is a remarkable uniformity, within the extremely narrow range. The process further provides continuously dispersions having a relatively uniform or constant alkali metal concentration. The particle size and alkali metal concentration of the final dispersion can be easily controlled by carefully controlling the rate of feed of alkali metal and solvent to the system, so that substantially all particles of alkali metal above the desired median size can settle out in the quiescent zone. In this way, the alkali metal particles in the final dispersion are brought to substantially uniform size and concentration.

The predetermined median particle size can be set at about 10 microns, or higher, and the above parameters can be adjusted accordingly. For example, if the median size is set at about 10 microns, all particles of molten alkali metal greater than 10 microns are allowed to settle out, and thereafter recycle until they are reduced below the median particle size. Particles of 10 microns or less will not settle out, but are drawn off as supernatant fine particles, and are present in uniform concentration.

The instant process can be employed in preparing dispersions of any alkali metals, including lithium, sodium, potassium, rubidium, cesium, and alloys or mixtures of two or more of these metals.

In carrying out the process, the molten alkali metal, inert organic medium, and dispersing aid should be maintained under an inert gas atmosphere at all times, such as a nitrogen, argon or other inert gas to prevent oxidation of the alkali metal, and reduce the possibility of explosion.

The separation of relatively coarse particles of molten alkali metal above the selected median from relatively fine particles of molten alkali metal at or below the selected median is best done by permitting settling of the coarse particles of the mixture in a quiescent zone. If the amount of molten alkali metal, inert organic median and dispersing aid agitated are properly adjusted, in the quiescent zone, particles of molten alkali metals at or greater than the median or maximum particle size (i.e., larger than 10 microns) will settle out, and particles at or less than the desired median particle size (i.e., 10 microns or smaller) will rise. The degree of settling and the rate varies with the density of the alkali metal employed, the range and size of the particles of molten metal, and the velocity of flow through the quiescent zone.

The inert organic diluent employed for dispersion of the alkali metal can be any organic liquid which is relatively inert to the alkali metal, and which can be heated to a temperature above the melting point of the alkali metal without causing decomposition. The organic liquid can be any liquid saturated aliphatic or cycloaliphatic hydrocarbon, or ether or other organic liquid inert to the alkali metal and in which the alkali metal is insoluble. The organic diluent should be a liquid under the conditions during which the alkali metal dispersion is formed. Where a sodium dispersion is prepared and is employed in the preparation of alfin catalysts, the inert organic diluent should be a liquid aliphatic or cycloaliphatic saturated hydrocarbon, which is liquid under the conditions during which the sodium dispersion and the alfin catalyst are formed. Sodium melts at 97.6° C. Hence, the diluent must be liquid at temperatures as low as −20° C. and below, and at temperatures as high as 150° C., the maximum temperatures normally reached during sodium dispersion formation, and usually from 20° to 130° C.

Satisfactory aliphatic hydrocarbon diluents include pentane, hexane, heptane, octane, nonane, and decane, as well as commercially available solvent mixtures including any of these hydrocarbons, such as petroleum ether, odorless mineral spirits, boiling range 349°–406° F., kerosene, and mineral oil, commercial isooctane, Isopar E, a material devoid of normal hydrocarbons, which typically has the composition:

| Component | Weight % |
|---|---|
| 2,2,4-trimethylpentane | 2.2 |
| 2,5-dimethylhexane) | 4.8 |
| 2,4-dimethylhexane) | |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane) | |
| 3,4-dimethylheptane ) | |
| 2,3-dimethylheptane ) | 5.7 |
| 3,3,4-trimethylhexane ) | |
| 15 other iso-components | 13.7 |
| $C_9$ naphtha + $C_{10+}$ | 1.8 |
| Total: | 100.0 |

2,2,4-trimethylpentane, or Sinclair's LIGHT ALKYLATE, having the following composition:

| Component | Weight % |
|---|---|
| 2-methylbutane | 10.0 |
| 2,3-dimethylbutane | 8.2 |
| 2,4-dimethylpentane | 5.8 |
| 2,3-dimethylpentane | 7.9 |

| | |
|---|---|
| 2,2,4-trimethylpentane | 21.5 |
| 18 other C$_8$ and C$_9$ branched aliphatic hydrocarbons | 46.6 |
| Total: | 100.0 |

Useful cycloaliphatic hydrocarbons include cyclohexane, cyclopentane, methyl cyclohexane, and cycloheptane. Examples of other suitable organic liquids include certain stable ethers, such as tetrahydrofuran and dibutyl ether.

The amount of alkali metal in the dispersion is not critical, and can be adjusted to suit the purpose for which the dispersion is employed. Normally, the alkali metal concentration can range from about 10 to about 60 percent, and preferably from about 20 to about 50 percent by weight. If the alkali metal dispersion is a sodium dispersion to be used in the preparation of an alfin catalyst, the sodium concentration should be within the range from about 25 to about 50 percent.

Efficient preparation of alkali metal dispersions of uniform concentration requires a rapid and complete breakdown of the gross alkali metal particles and the prevention of the resultant finely divided particles from coalescing. It is desirable to employ from 0.5 to 5 percent by weight of the sodium of a selected dispersing aid to promote sodium particle breakdown, and selected stabilizing agents to prevent particle coalescence.

Especially preferred are compounds that are capable of acting simultaneously as both a dispersing aid and a stabilizing agent. Highly suitable are organic salts wherein the metal is displaceable by the alkali metal being dispersed. Such salts include salts of organic acids, alcohols, glycols, and ketones, for example, of the general formulas R—COOM, R—OM,

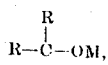

respectively, wherein R is an alkyl or alkylene radical or from about three to about 36 carbon atoms and M is a metal displaceable by the alkali metal being dispersed, for example, copper, aluminum, calcium, zinc, lead, etc. Specific compounds include salts of fatty acids, e.g., copper oleate, aluminum distearate, aluminum dilaurate, calcium monostearate, lead naphthenate, zinc stearate, and other metallic soaps, as well as alcoholates of fatty alcohols, long chain glycols, and ketone enolates. Aluminum distearate is particularly suitable.

Apparently the active dispersing agent when using a metal salt ultimately is an alkali metal salt of an acid, alcohol, glycol, or ketone. While the alkali metal salt could be added initially, it has been found more effective to form the alkali metal salt in situ by a displacement reaction. It is believed that the more noble metal, e.g., copper, aluminum, etc., displaced by the alkali metal forms in the course of its displacement a protective colloid about the fine alkali metal droplets and thereby prevents the droplets from coalescing.

Certain compounds function primarily as dispersing aids and, therefore, should be used in conjunction with a stabilizing agent. Such compounds include dimer acid, the product formed by the combination of two molecules of unsaturated fatty acids, such as oleic or linoleic; lecithin; polymers; rubbers; etc.

Inorganic salts wherein the metal portion is displaceable by the alkali metal being dispersed, i.e., wherein the metal of the salt is lower in the electromotive series than the alkali metal, can be employed as stabilizing agents. Examples of such salts are magnesium chloride, cupric chloride, cuprous chloride, ferric chloride, cupric bromide, ferric sulfate, etc. Such inorganic salts, however, are not effective as dispersing aids; consequently, an alkali metal reactive organic molecule such as C$_4$ to C$_{36}$ acid, alcohol, glycol, or ketone must also be provided to achieve a proper environment for the formation of the dispersion.

The invention also provides apparatus suitable for preparing the finely divided alkali metal dispersions of a narrow particle size range and uniform alkali metal concentration, comprising a high shear dispersion zone, e.g., a colloid mill or homogenizer, for dispersing the molten alkali metal in an inert organic diluent, means for defining a quiescent zone in which relatively coarse particles can settle out and from which relatively fine particles can be withdrawn, means for continuously returning the relatively coarse particles to the high shear dispersion zone, for further size reduction; and for continuously returning the resulting fine particles to the quiescent zone; means for withdrawing the relatively fine particles at or below a predetermined median size, and means for maintaining the alkali metal at a temperature above its melting point throughout.

It is preferred to provide a mixing zone and a separate high shear dispersion zone. The conduits for feeding the starting materials, molten alkali metal and inert organic liquid-dispersing aid mixture, are positioned to feed directly into the mixing zone, preferably above the surface of the liquid. A baffle is provided to define a quiescent zone for fluid classification of the treated dispersion, allowing the coarse particles to settle out and the fine particles to be withdrawn from the top of the quiescent zone. The oversize material is returned to the high shear zone, such as the homogenizing apparatus, where it is further reduced in particle size, and continuously returned to the quiescent zone so that the finer particles at or below the predetermined maximum size (the median size) can be withdrawn, and the coarser particles separated and processed again.

The contents of the mixing tank and circulation system can be maintained at a temperature above the melting point of the alkali metal, for example, by jacketing the equipment and heating it with steam or oil. It is advantageous to maintain an inert gas blanket on the system to prevent oxidation of the alkali metal, such as sodium, and for safety purposes.

The apparatus described for carrying out the process of the invention is shown in the accompanying figures.

FIG. 1 is a general flow diagram showing the details of the mixing tank and the circulating and feed system.

Figure 2:
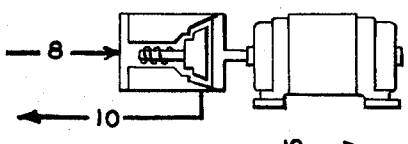
Figure 4:
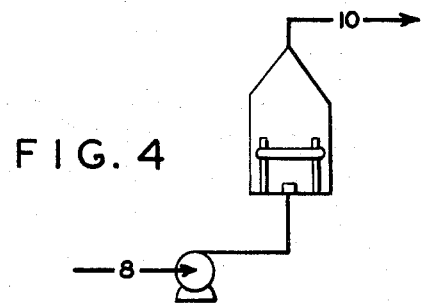
Figure 3:
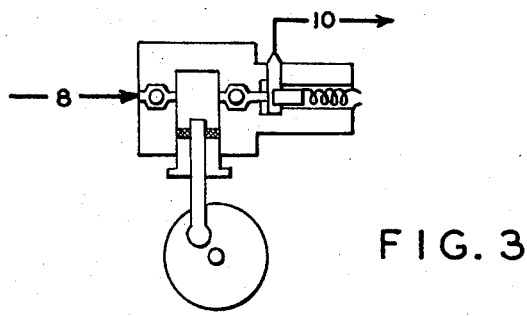

FIGS. 2, 3, and 4 show the dispersing units.

For the scale of operation indicated in the examples, a mixing tank 7 inches in diameter and 10 inches high was employed. The baffle in this mixing unit is sufficient in cross section to encompass a settling section of about 100 cubic inches, and the unit contains a mixing section of about 200 cubic inches. A propeller agitator 2 inches in diameter is operated at 1,500 r.p.m. in the pump zone. In these operations homogenizers operating at circulation rates of 125 to 420 gallons per hour and a colloid mill operating at flow rates of 50 to 420 gallons per hour were employed. Output volumes from these units was 1 to 2 gallons per hour. By increasing the scale of operation, the circulation rate can be increased to a level of 3,500 gallons per hour with an output of 300 gallons per hour or more.

In FIG. 1, 1 and 2 indicate the respective molten alkali metal and inert organic medium plus dispersing aid feed conduits; 3 is the conduit used for providing an inert gas blanket, for example, nitrogen or argon depending on the alkali metal treated; 4 is the propeller agitator used for dispersing the mixture; 5 is a baffle plate used in separating the mixing and quiescent zone; 6 is the settling or quiescent zone; 7 is the discharge part for the finished dispersion; 8 and 10 are the conduits for transporting the dispersions to and from 9 which is the homogenizing device; and 11 is a jacket which is filled with heating medium.

The devices shown in FIGS. 2, 3 and 4 are common to industry and are shown merely to indicate their action in dispersing molten alkali metals in inert organic diluents.

FIG. 2 is a rotary colloid mill that operates at atmospheric pressure with the power necessary to produce dispersions being transmitted to the liquid by the high speed internal recirculation obtained in the colloid mill. Colloid mills of the character with which we here are concerned are available commercially and a particularly suitable mill is that produced by Patterson Industries, East Liverpool, Ohio, under the trademark "TRI-HOMO."

FIG. 3 is a positive displacement valve homogenizer that disperses the liquid by high pressure injection through an orifice. A commercially available displacement valve homogenizer suitable for present purposes is known as a "MANTON-GAULIN Mill," manufactured by the Gaulin Corporation, Everest, Massachusetts.

FIG. 4 is a vibrating reed-type homogenizer. This unit disperses liquids by forcing the liquid over a metal reed that vibrates at ultrasonic frequencies. A commercially available reed-type homogenizer suitable for present purposes is known as the "ULTRASONIC" Homogenizer, produced by the Sonic Engineering Company, Norwalk, Connecticut.

In carrying out the process of the instant invention employing the apparatus of FIG. 1, in preparing a dispersion of sodium, for example, a portion of an inert organic diluent-dispersing aid mixture is charged into the mixing tank, and circulating conduits 8 and 10, homogenizer 9, and the mixing tank agitator 4 are started. The jacket 11 of the mixing tank is filled with the heating medium. The diluent and dispersing aid mixture is circulated through the homogenizer 9 until the temperature of the system rises to operating temperature. Then, the molten sodium feed 1 is started and inert organic diluent and dispersing aid 2 are also fed simultaneously into the mixing tank, and mixed by the agitator 4. The mixture so produced containing coarse sodium particles enters the quiescent zone 6 created within the displacement baffle 5, and all the sodium particles settle out, since none is small enough, for example, 10 microns or less, to rise to the top of the quiescent zone and be discharged through conduit 7. The coarse particles of molten sodium of more than, for example, 10 microns, which settle out in the quiescent zone, are pumped through conduit 8 and the homogenizer 9 to reduce the particle size of the molten sodium, and the homogenizate is then transported through conduit 10 to the mixing tank where it is returned to the quiescent zone. Now, some of the sodium particles are small enough to use and these are drawn off through conduit 7. The remainder again settles out, and is recycled again, and this is repeated automatically so that particles above the median size are always recycled. The throughput on this system is suitably controlled by varying the rate of feed of streams 1 and 2 to cause an average of from two to ten recycles of the sodium through the homogenizer before withdrawal as fine particles in the quiescent zone, while allowing all coarse material over say 10 microns in size to settle out and return to the homogenizer for further size reduction. The baffle is positioned to encompass a quiescent zone sufficient to provide a maximum upflow velocity of less than about 0.5 foot per second, at maximum process rate. The fine dispersion is withdrawn through the discharge port 7 to storage, or for example, to alfin catalyst preparation. The unit described can be operated at raw feed input rates of from about 2 to about 48 pounds per hour.

The invention also provides an improved process for preparing alfin catalysts employing the sodium dispersion produced in accordance with the instant invention.

The sodium dispersion in the inert diluent can be employed in the usual way in any desired preparation of alfin catalyst. A typical preparation of an alfin catalyst has been described above, and is described in detail in the Greenberg et al. U.S. Pat. Nos. 3,067,187 and 3,223,691 and in the Morton articles supra. In addition, another preparation of an alfin catalyst is described in U.S. Pat. No. 3,317,437, issued May 2, 1967, to Hoffman and Morgan, and under the heading "PREPARATION OF ALFIN CATALYST" (set out hereinafter) wherein an alfin catalyst of satisfactory activity is obtained by inverting the order of reaction of the components and substituting n-butyl chloride for n-amyl chloride. In this method, sodium isopropoxide is formed by direct reaction with sodium, instead of with alkyl sodium, with a saving of one-half of the alkyl halide and one quarter of the sodium.

As the alcohol component used to form the sodium alkoxide, any methyl n-alkyl carbinol having from one to about 10 carbon atoms can be used, such as isopropanol, methyl-n-propyl carbinol, and methyl-n-butyl carbinol. Isopropanol is preferred.

The alkoxide will form at rather low temperatures, as low as $-20°$ C. being satisfactory. There is no upper limit on reaction temperature.

The olefin has from about three to about ten carbon atoms, and should contain the group $-CH=CH-CH_2-$. Propylene is preferred, giving allyl sodium, but butene-1, butene-2, pentene-1 and hexene-1 can also be used. Terminal olefins $CH_2=CH-CH_2-$ are preferred. Activity may decrease as the olefin molecular weight increases.

The alkenyl sodium, sodium halide and sodium alkoxide composing the alfin catalyst are prepared by reaction of the sodium slurry of the invention with the alcohol and the olefin in the presence of the dispersing liquid used for the catalyst. This can be and preferably is the same as the inert diluent used for the sodium dispersion. Frequently, however, a lower boiling hydrocarbon such as hexane is used, to facilitate separation later. Any inert aliphatic or cycloaliphatic hydrocarbon is satisfactory.

The olefin is metallated by use of an alkyl sodium, the organic portion having from about three to about ten carbon atoms. Amyl chloride is preferred, but butyl chloride, hexyl chloride, hexyl bromide, heptyl chloride, amyl bromide, and octyl chloride can also be used.

The reaction will proceed at low temperatures, which is advantageous when the olefin is a gas, such as propylene. A temperature from about $-20°$ to about $+80°$ C. can be employed. From 1 to about 5 hours reaction time is normally adequate.

The reaction mixture can be prepared by mixing the catalyst diluent, sodium dispersion and alkyl halide, and then adding the alcohol. After the alkoxide has been formed, the olefin is added, and metallated. Excess olefin is removed, and the residue can be used as the alfin catalyst, without further treatment or purification. In this method, the sodium is first converted to the alkyl sodium, and half this is then converted to the alkoxide, while the remainder is converted to alkenyl sodium. This procedure is described in U.S. Pat. No. 3,317,437, issued May 2, 1967, to Hoffman et al.

It is also possible to add the alcohol to the sodium dispersion mixed with the catalyst diluent, forming the sodium alkoxide, and then adding the alkyl halide, and, finally, the olefin. This procedure requires half the amount of alkyl halide, and three-quarters the amount of sodium, required by the first procedure, and is therefore preferred in a commercial operation.

The alfin catalyst obtained can be employed in the alfin polymerization of a wide variety of unsaturated organic compounds, including aliphatic dienes such as 1,3-butadiene, 2,3-dimethyl-1,3-butadiene, isoprene, piperylene, 3-methoxy-1,3-butadiene, aryl olefins, such as styrene, the various alkyl styrenes, p-methoxy-styrene, alpha-methyl-styrene, vinyl naphthalene, and other unsaturated hydrocarbons. 1,3-butadiene alone and combinations of butadiene and styrene or isoprene are preferred polymerizable unsaturated compounds.

The amount of alfin catalyst (solids basis) that is employed for the alfin polymerization is normally from about 1 to about 5 weight percent, and preferably from about 1 to about 3.5 weight percent, based on the weight of the unsaturated organic compound.

The alfin polymerization reaction generally takes place at atmospheric pressure and room temperature in a suitable reaction medium. The pressure and temperature conditions are not critical, however, and the reaction will take place at any pressure within the range from about 1 to about 50 atmospheres and at any temperature within the range from about $-25°$ to about $+100°$ C.

Preferred reaction media are inert aliphatic and cycloaliphatic hydrocarbons, such as pentane, hexane, 1:1 mixture of hexane and pentane, octane, cyclohexane, cyclopentane, cycloheptane, decalin, and heptane. A preferred reaction solvent is the hydrocarbon employed for the dispersion of sodium in the preparation of the alfin catalyst.

It is quite important that water be excluded from the alfin polymerization reaction mixture, and consequently it is essential that all components that eventually will be employed therein, including the solvent and dispersing aid employed in the dispersion of the sodium, be anhydrous.

The polymerization reaction can be conducted in a batchwise, semi-continuous, or continuous manner, and the polymers and copolymers obtained as reaction products can be recovered by any conventional technique.

In the following examples the apparatus described hereinbefore was employed. The progress of dispersion was followed by diluting samples of the process stream with a dilute hydrocarbon and measuring the particle size and distribution by observing them through a microscope and by measuring the sedimentation rate. The alkali metal dispersions produced according to the process of this invention are stable over prolonged periods at temperatures both above and below the melting point of the alkali metal as long as they are maintained in an inert atmosphere. They can be readily cooled below the melting point of the alkali metal and transported by pump with little or no difficulty.

The following examples in the opinion of the inventors represent preferred embodiments of their invention.

EXAMPLE 1

One gallon of mineral spirits containing about 0.04 pound of copper oleate in solution was introduced into the mixing tank described in FIG. 1, and the system, utilizing a valve homogenizer (FIG. 3), was heated and circulated until the temperature reached 220° F. The agitator in the mixing tank was started. The molten sodium and hydrocarbon-dispersing aid streams were started and continuously fed to the mixing tank at a rate of 0.5 pound of sodium and 1.5 pounds of hydrocarbon-dispersing aid mixture per hour. The homogenizing valve was adjusted to provide a back pressure on the homogenizer feed pump of 4,500 pounds per square inch (p.s.i.) at a pump rate of 25 gallons per hour (g.p.h.).

The mixture containing the molten sodium greater than 10 microns settled out, whereas particles of molten sodium of 10 microns or less rose to the top of the quiescent zone. The coarse particles were continuously recycled to the homogenizer, to reduce the particle size of the molten sodium further, to less than 10 microns, and then continuously returned to the mixing tank. When the quiescent zone of the mixing tank had filled to the overflow, a dispersion of fine particles began to be withdrawn continuously. Periodic analysis showed the particle size of this dispersion to be 1 to 3 microns, with all particles below 10 microns, and the sodium concentration was uniform at 25 percent.

EXAMPLE 2

One gallon of mineral spirits containing 0.04 pound of aluminum distearate was charged to the mixing tank of the system shown in FIG. 1, and the agitator started. Circulation through the system, utilizing a valve homogenizer, was begun; when the temperature of the hydrocarbon mixture reached 220° F., the molten sodium and hydrocarbon-dispersing aid streams were started and continuously fed to the mixing tank at a rate of 0.5 pound of sodium and 1.5 pounds of diluent mixture per hour. The homogenizing valve was adjusted to provide a level pressure on the homogenizer feed pump of 4,500 p.s.i. at a circulation rate of 25 g.p.h.

The mixture containing the molten sodium continuously entered the quiescent zone, and particles of molten sodium greater than 10 microns settled out, whereas particles of molten sodium of 10 microns or less rose to the top of the quiescent zone. The coarse particles were continuously recycled to the homogenizer to further reduce the particle size of the molten sodium to less than 10 microns, and then continuously returned to the mixing tank. When the level of the quiescent zone had filled to the overflow, a dispersion of fine particles began to overflow, and was withdrawn continuously thereafter. Periodic analysis of this dispersion showed an average particle size of 1 to 2 microns with no particles larger than 10 microns, and a sodium concentration that remained uniform at about 25 percent.

EXAMPLE 3

One gallon of mineral spirits containing 0.04 pound of aluminum distearate was charged to the mixing tank of the system shown in FIG. 1 and the agitator started. Circulation through the system, utilizing a valve homogenizer, was begun; when the temperature of the hydrocarbon reached 220° F., the molten sodium and hydrocarbon-dispersing aid stream were started, and continuously fed to the mixing tank at a rate of 4 pounds of sodium and 12 pounds of solvent mixture per hour. The homogenizing valve was adjusted to provide a level pressure on the homogenizer feed pump of 1,200 p.s.i. at a 125 g.p.h. circulation rate.

The mixture containing the molten sodium continuously entered the quiescent zone and particles of molten sodium greater than 10 microns settled out, whereas particles of molten sodium of 10 microns or less rose to the top of the quiescent zone. The coarse particles were continuously recycled to the homogenizer, to reduce the particle size of the molten sodium further, to 2 microns or less, and then continuously returned to the mixing tank. After the quiescent zone of the mixing tank had filled to the overflow, a dispersion of fine particles was withdrawn continuously, and analyzed periodically for particle size and sodium content. The average particle size was 1 to 3 microns, with no particles larger than 10 microns, and the sodium content was constant at about 24 weight percent.

CONTROL 1

The baffle 5 was removed from the mixing tank of this apparatus so that there was no quiescent zone 6. The unit was then run as in Example 3 with mixing in the mixing tank. Samples of the overflow were removed every hour for 4 hours and analyzed for particle size and sodium content. The average particle size over a period of 20 hours of operation ranged from 1 to about 30 microns. The sodium content over the same period varied from 22 to 31 percent. The importance of the baffle in ensuring uniformity in size and concentration is evident.

Without the quiescent zone, no separation of the coarse and fine particles was possible, and a large variation in sodium particle size and concentration was noted in the dispersion product.

CONTROL 2

The unit was operated as in Control 1, except that in addition no agitation was provided in the mixing tank. Samples of the dispersion were analyzed for particle size and sodium content over a period of 24 hours. The average particle size ranged from 1 to 50 microns and the sodium concentration from 7 to 35 percent, and neither was constant over any part of this period.

Accordingly, it is seen that where the mixture containing the molten sodium was not agitated, and there is no quiescent zone, an extremely large variation in sodium particle size and concentration of the dispersion produced was noted. However, where both agitation and quiescent zone was employed, as in Example 3, the resulting sodium dispersion was substantially uniform in sodium particle size and concentration.

EXAMPLE 4

The dispersion system of FIG. 1 was started as in Example 3 and operated continuously for 120 hours at a rate of 4 pounds of sodium and 12 pounds of hydrocarbon-aluminum distearate mixture per hour. Samples were removed from the overflow every 6 hours during this period and analyzed for particle size and total sodium. The particle size range was 1 to 4 microns, averaging 2 microns, and the sodium content ranged from 24.7 to 25.7 weight percent, averaging 25.1 percent.

EXAMPLE 5

In experiments in which a colloid mill was used as the source of shear, as shown in FIG. 2, 1 gallon of mineral spirits containing 0.04 pound of aluminum distearate was charged to the mixing tank of the system of FIG. 1, the mixing tank agitator and colloid mill were started, and the system was heated. When the temperature of the circulating fluid had reached 230° F., the molten metal and hydrocarbon-aluminum distearate feed streams were started and continuously fed to the mixing tank at a rate of 1.0 pound of sodium and 3.0 pounds of hydrocarbon-aluminum distearate per hour. Circulation was maintained at a rate of 100 g.p.h.

The mixture containing the molten sodium continuously entered the quiescent zone and particles of molten sodium greater than 10 microns settled out, whereas fine particles of molten sodium of 10 microns or less rose to the top of the quiescent zone. The coarse particles were then continuously recycled to the homogenizer to reduce the particle size of the molten sodium to 10 microns or less, and then continuously returned to the mixing tank. When the level in the mixing tank had reached the product overflow, dispersion was removed continuously and periodically analyzed for average particle size and metal content. These were found to be 1 to 3 microns, with no particles above 10 microns, and a uniform 25 weight percent, respectively.

EXAMPLE 6

In experiments in which a reed-type homogenizer was used as the means of shear, as shown in FIG. 3, 1 gallon of hydrocarbon containing 0.04 percent of aluminum distearate was charged through the mixing tank of the system of FIG. 1, and agitation and circulation were started. When the system had been heated to 220° to 240° F., the feed streams were started and continuously fed to the mixing tank at a rate of 2 pounds of molten alkali metal and 6 pounds of hydrocarbon-aluminum distearate mix. The circulation rate was maintained at 420 g.p.h. at an operating pressure drop in the reed reactor of 100 p.s.i.g.

The mixture containing the molten sodium continuously entered the quiescent zone and coarse particles of molten sodium greater than 10 microns settled out, whereas fine particles of molten sodium of 10 microns or less rose to the top of the quiescent zone. The coarse particles were continuously recycled to the homogenizer to reduce the particle size of the molten sodium to 10 microns or less, and then continuously returned to the mixing tank. After sufficient raw feed material had been introduced to raise the liquid volume in the mixing tank to the overflow, dispersion was continuously removed from the overflow and analyzed periodically for average particle size and sodium content. The particle size range was 1 to 5 microns, with an average of 2 microns, and the sodium content was a uniform 25 weight percent.

EXAMPLE 7

1 gallon of odorless mineral spirits containing about 0.04 pound of aluminum distearate was charged to the system of FIG. 1, using a valve homogenizer. The mixing tank agitator and circulating pump were started, and the system was heated to 220° F. The molten potassium and aluminum distearate diluent feed streams were started, and continuously fed to the mixing tank at hourly feed rates of 2.0 pounds of potassium and 6 pounds of diluent containing 0.04 pound of aluminum distearate. The homogenizing valve was adjusted to provide a fixed back pressure of 1,200 p.s.i. on the homogenizer feed pump, at a circulation rate of 125 g.p.h.

The mixture containing the molten potassium continuously entered the quiescent zone, and coarse particles of molten potassium greater than 10 microns settled out, whereas fine particles of molten potassium of 10 microns or less rose to the top of the quiescent zone. The coarse particles were continuously recycled to the homogenizer to reduce the particle size of the molten potassium to 10 microns or less and then continuously returned to the mixing tank. When the liquid level in the mixing tank reached the overflow, the overflowing dispersion was withdrawn continuously, and periodically analyzed for particle size and potassium content. The range of particle size was 1 to 3 microns, with an average of 1+, and the potassium content was uniform at 25 percent.

EXAMPLE 8

One gallon of isooctane containing about 0.04 pound of aluminum distearate was charged to the system of FIG. 1, using a valve homogenizer. The mixing agitator and circulating pump were started, and the system was heated to 100° F., after which feeding of aluminum distearate in isooctane and of molten cesium was begun, at rates of 1.5 pounds and 0.5 pound per hour, respectively. Circulation was maintained for 10 minutes at a homogenizer pressure of 1,200 p.s.i. at 100° F. at a circulation rate of 125 gallons per hour.

The mixture containing the molten cesium continuously entered the quiescent zone and coarse particles of molten cesium greater than 10 microns settled out, whereas fine particles of molten cesium of 10 microns or less rose to the top of the quiescent zone. The coarse particles were continuously recycled to the homogenizer to reduce the particle size of the molten cesium to 10 microns or less and then continuously returned to the mixing tank.

The range of particle size of the finely divided cesium dispersion displaced through the overflow conduit was 1 to 3 microns, with an average of 2 microns and the cesium content was uniform at 25 percent.

EXAMPLE 9

The finely divided sodium dispersion product of Example 1 was employed in preparing an alfin catalyst as follows:

Dry hexane (465 parts) was charged to a three-necked flask provided with a stirrer, inert gas sweep, and a dry ice reflux condenser system. To this was added 13.8 parts of the finely divided sodium dispersion containing about 2 percent aluminum distearate. To the stirred slurry of sodium particles there was added dropwise 12.1 parts (0.2 mole) of dry isopropanol over a period of 15 minutes during which time the temperature rose to about 40° C. After stirring for 1 hour 18.9 parts (0.2 mole) of n-butyl chloride was added over a period of 1 hour during which time the temperature rose to about 50° C. Stirring was then maintained for an additional hour. Excess dry propylene (C.P. grade) was subsequently introduced into the mixture, the temperature of which was permitted to fall to 20° C. by means of an active reflux of liquefied propylene. The preparation was permitted to stand for 8 hours with a propylene reflux before venting to remove excess propylene. The reactive slurry was transferred to a storage vessel and maintained under an atmosphere of inert gas. This alfin catalyst preparation (800 ml.) contains equimolar quantities of sodium isopropoxide, sodium chloride and sodium allyl. The preparation contains the equivalent of 0.00075 mole of total sodium compounds per milliliter or 0.00025 mole of the active sodium allyl.

Having regard to the foregoing disclosure, the following is claimed as the inventive and patentable embodiments thereof.

1. Apparatus for preparing dispersions of finely divided alkali metal substantially uniform in alkali metal concentration and having a narrow particle size range below a predetermined median, said apparatus comprising a mixing tank having a heating jacket and including closed top and bottom walls; conduits extending through said closed top wall for the metered and separate delivery to said mixing tank of molten sodium feed, a diluent dispersing aid mixture and an inert gas blanket; a vertically disposed arcuate baffle mounted within said mixing tank adjacent the inner wall surface thereof and dividing said mixing tank into a mixing zone and a quiescent zone, the area of said quiescent zone being on the order of 50 percent of that of said mixing zone; a rotary agitator extending through said top wall and into said mixing zone for dispersing the mixture received therein; means for imparting rotary motion to said agitator whereby said dispersed mixture including alkali metal particles will enter into said quiescent zone and coarse particles will gravitate therethrough; an homogenizer constituting a high shear dispersion zone; conduit means extending through the bottom wall of said mixing tank for conveying the mixture to said homogenizer wherein reduction in alkali metal particle size is accomplished; conduit means connected to said homogenizer and communicating with the interior of said mixing tank through the top wall thereof for returning the homogenizate to said mixing tank to permit the repeated recirculation of said mixture; and conduit means extending through the side wall of said tank into said quiescent zone adjacent the upper extremity thereof for continuously withdrawing a uniform dispersion containing only the fine particles of alkali metal which rise to the top of the quiescent zone as the predetermined median size range is reached.

2. Apparatus as set forth in claim 1 wherein the high shear dispersion zone is a colloid mill.

3. Apparatus as set forth in claim 1 wherein the high shear dispersion zone is a displacement valve homogenizer.

4. Apparatus as set forth in claim 1 wherein the high shear dispersion zone is a reed-type homogenizer.

5. Apparatus as set forth in claim 1 wherein the vertical edge walls of the arcuate baffle are located in close and parallel relationship with respect to the adjacent interior wall of the mixing tank and the bottom of said mixing tank is conical and the conduit means for conveying mixture to the homogenizer is connected centrally thereof.

* * * * *